May 5, 1970            C. C. HACH            3,510,263
TEST PAPERS, METHODS FOR CARRYING OUT CHEMICAL ANALYSES
AND METHODS FOR MAKING THE TEST PAPERS
Filed Jan. 5, 1968            3 Sheets-Sheet 1
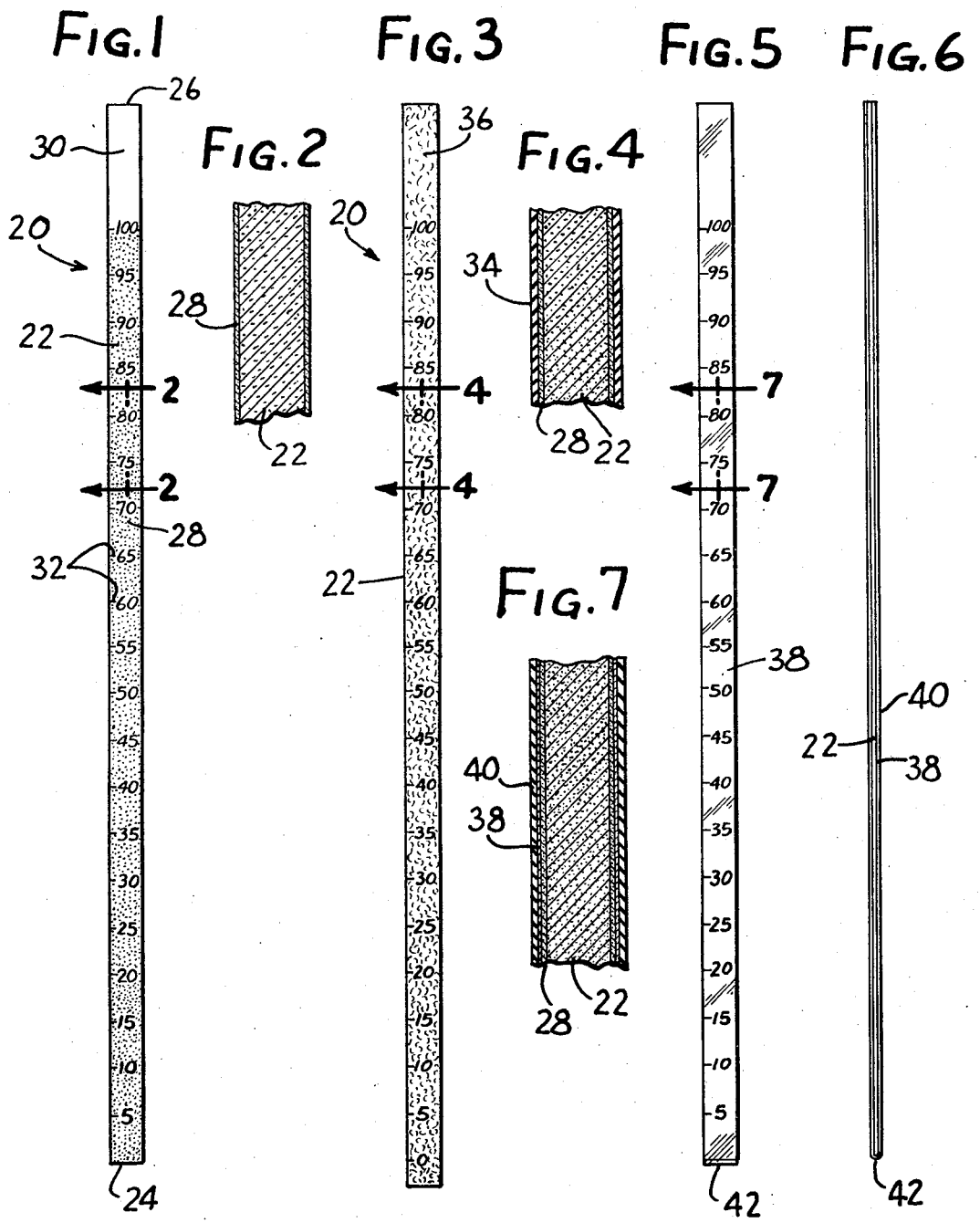
INVENTOR
CLIFFORD C. HACH
by: Wolfe, Hubbard, Voit & Osann
ATTYS.

INVENTOR
CLIFFORD C. HACH

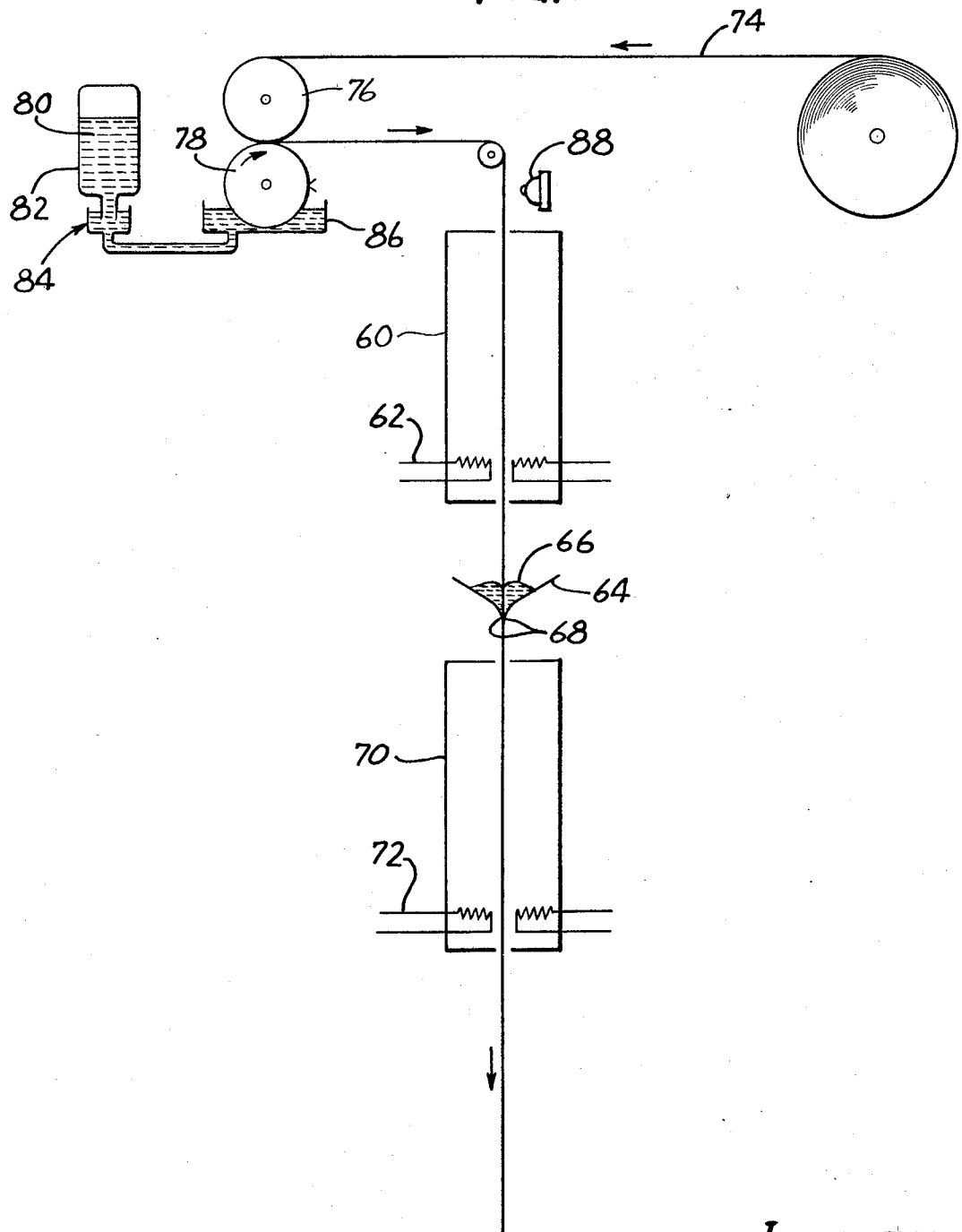

United States Patent Office 3,510,263
Patented May 5, 1970

3,510,263
TEST PAPERS, METHODS FOR CARRYING OUT CHEMICAL ANALYSES AND METHODS FOR MAKING THE TEST PAPERS
Clifford H. Hach, Ames, Iowa, assignor to Hach Chemical Company, Ames, Iowa, a corporation of Iowa
Filed Jan. 5, 1968, Ser. No. 696,037
Int. Cl. G01n 31/16, 31/22; B05c 1/12
U.S. Cl. 23—253
18 Claims

ABSTRACT OF THE DISCLOSURE

A test paper and method for quantitatively carrying out chemical analyses such as, for example, the chloride determination, on liquid test sources by titrametric methods wherein the test paper includes a bibulous member impregnated with a continuous zone of linearly increasing concentration corresponding to a particular concentration range for the analysis being carried out, e.g. as 0 to 25,000 parts per million for the chloride determination, and further impregnated with an indicator to signal the particular concentration of the test source and methods for making the test paper. In accordance with one aspect, the surface area that the test liquid can contact is maintained at a minimum by coating or covering a large portion of the test paper to control the amount of liquid taken up by the bibulous member and allow use regardless of the solubility of the compounds involved.

This invention relates to test papers and, more particularly, to test papers for carrying out quantitative chemical analyses by titrametric methods, methods for carrying out the analyses using the test papers and methods for making the test papers.

Test papers utilizing a colorimetric reagent have been previously used to determine either the qualitative or quantitative presence of a particular substance in a solution. The qualitative determination is customarily made by noting either the development of a color or a color change. The quantitative determination of a substance has generally been made by determining the degree of color development and then relating this to the concentration of the substance.

The use of these colorimetric test papers as quantitative measurements is, of course, limited by the amount of the substance that results in complete color development. The versatility of the test papers is also limited by the solubility characteristics of the chemical compounds involved. If the colorimetric reagent or its reaction product with the substance being measured is soluble in the solution being tested, the accuracy of quantitative measurements could be impaired by the soluble compound or compounds washing away from the test paper.

For quantitatively determining the concentration of a particular substance in a solution, it is accordingly desirable to utilize titration because this can generally be carried out regardless of the concentration. One test paper previously used to perform a titration function is impregnated with a titrant and also with an indicator capable of indicating the equivalence point of the reaction between the titrant and the particular substance or substances involved in the analysis. The test paper is dipped into the solution up to a certain point so that a measured quantity of water will be absorbed. Over a period of time, this measured quantity is then allowed to migrate up along the length of the paper by capillary action. In effect, this carries out a chromatographic separation; and the concentration of the substance is determined from the length of the color change. Migration of the substance whose quantitative presence is being determined may require, for completion of the test, the passage of 15 minutes or more in some situations. In addition, because of the characteristics associated with this chromatographic separation, the length of the passage of the substance is, of course, nonlinear with respect to its concentration; and the higher concentration marks become succeedingly closer together. Accurate resolution of these higher concentrations accordingly becomes quite difficult. A titrant, indicator or reaction product involved in the analysis that is soluble in the solution being tested will restrict the practical use of these test papers because of the loss of soluble compound during use.

Another type of test paper has been used for measuring the hardness of water. This includes a strip having a plurality of concentration zones, e.g., 4, each impregnated with a substance that is color-responsive to a different concentration of calcium and magnesium ions and a suitable indicator. The zones are spatially separated and the concentrations used are generally chosen so as to reflect the character of the water as regards hardness, e.g., medium hard.

The accuracy of the quantitative analysis of any of these prior methods is dependent upon a given portion of a test paper being able to absorb only a predetermined volume of the liquid being tested. Any modification of this volume, such as by accumulation on the surface of the test paper, will then impair the accuracy of the measurement.

It is accordingly an object of the present invention to provide test papers, methods for carrying out analyses using the papers and methods for making the papers wherein the test papers are characterized by their ability to quickly carry out a quantitative analysis by titrametric methods for a predetermined substance or substances. In this connection, a related and more specific aspect includes the provision of test papers having impregnated therein a titrant in a linearly increasing concentration that corresponds to a given concentration range for the substance or substances involved in the analysis.

Another aspect includes the provision of test papers of the above-identified type that are capable of accurately carrying out analyses regardless of the relative concentrations involved.

A further object provides methods that can be used to simply and economically make test papers of the type set forth above.

A still further object of this invention is to provide test papers and methods for chemical analyses using these test papers that can be carried out with increased accuracy.

A further aspect includes the provision of methods for accurately carrying out analyses regardless of the solubility characteristics of the titrant, indicator and other substances involved.

Other objects and advantages of the invention will become apparent as the following description proceeds, taken in conjunction with the accompanying drawings, all using as an example of an analysis the determination of the hardness of water, in which:

FIG. 1 is a front elevation view of one embodiment of the test paper of this invention;

FIG. 2 is an enlarged, fragmentary cross-sectional view taken substantially along the line 2—2 of FIG. 1;

FIG. 3 is a front elevation view of another embodiment and depicting a test paper wherein the faces have been coated with a water repellent material except for a small area adjacent each end to increase the accuracy and to make the test virtually independent of the solubilities of the substances involved;

FIG. 4 is an enlarged, fragmentary cross-sectional view taken substantially along line 4—4 of FIG. 3;

FIG. 5 is a front elevation view of still another embodiment and illustrating a test paper having a film affixed to its faces except for a portion adjacent one end to increase the accuracy and to make the test substantially independent of the solubilities involved;

FIG. 6 is a side elevation view of the embodiment illustrated in FIG. 5;

FIG. 7 is an enlarged, fragmentary cross-sectional view taken substantially along the line 7—7 of FIG. 5 and illustrating the positioning of the cover film relative to the bibulous member substrate;

FIG. 10 is a schematic view of apparatus capable of forming the test papers of this invention in accordance with another method.

Figure 8:
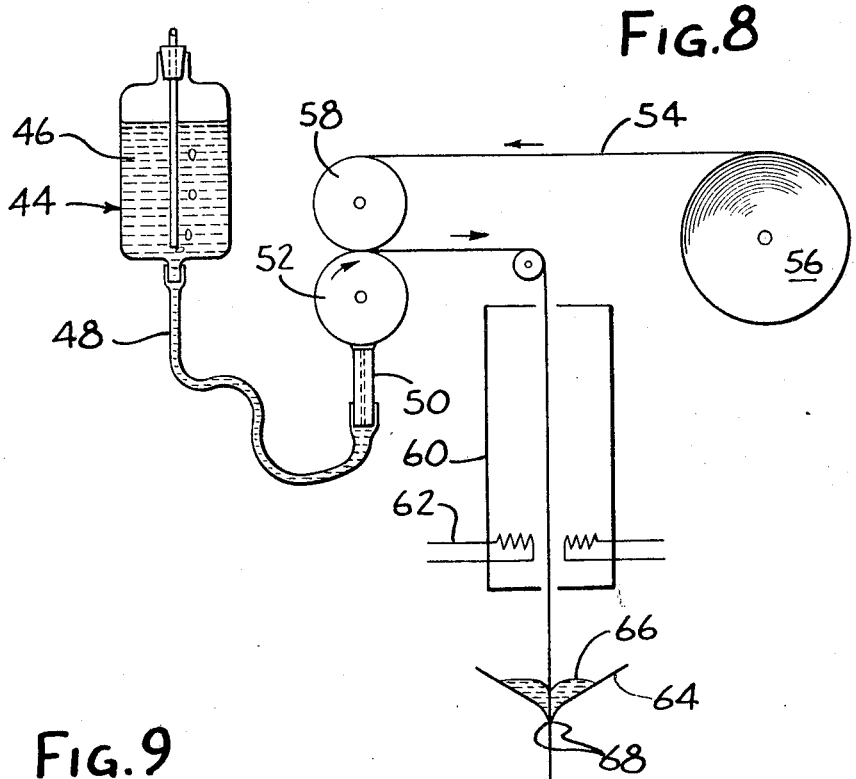
FIG. 8 is a schematic view of apparatus suitable for making the test papers in accordance with one method of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. For example, while the novel test papers will be described in connection with the quantitative determination of certain substances, it should be appreciated that it can be used for analyses involving the titrametric determination of virtually any substance. Similarly, although it is desirable for the color development or change involved to be in the visual range, it can also be in the ultraviolet range. Also, while the test papers can suitably be made of commercially available filter paper and be in the shape of a flat strip, it should be appreciated that the test papers can also be made of any bibulous member capable of holding the test liquid and could have other shapes such as cylindrical.

In accordance with the present invention, test papers for carrying out chemical analyses by titrametric methods are provided which are characterized by their ability to quickly and accurately make the analyses regardless of the concentrations involved. Thus, the novel test papers or members include a bibulous member that is impregnated with a predetermined titrant for the analysis in a continuous zone of linearly increasing concentration which corresponds to a predetermined concentration range for the analysis. The zone is also impregnated with an indicator present in an amount sufficient to signal an excess of the substance or substances being analyzed for. A buffer capable of maintaining the liquid being tested within a predetermined pH range can also be added, if needed. The bibulous member can include indicia such as a printed scale to enable the user to readily determine the concentration of the substance or substances involved.

The test members of this invention are used by dipping them into the test liquid so that the portion of the bibulous member having the impregnated titration zone becomes saturated. The test member or paper can then be removed and the color change on development witnessed. The presence of the indicator will cause a color change all along the zone until the concentration of titrant is such that the equivalence point is reached. The concentration of the quantitative unknown or unknowns in the analysis can then be read off the printed scale. The entire procedure requires only a few seconds, i.e., 3 to 4 in most cases.

In accordance with one aspect of the present invention, the accuracy may be increased and the test made virtually independent of solubilities by restricting the portion of the surface area of the bibulous member that the liquid test source can contact to a minimum yet still allowing the bibulous member to become saturated within a few seconds. Suitably, the area that can be contacted is less than about 10% of the total surface area of the bibulous member defined by the zone. When the bibulous member is in the shape of a strip, the area of contact through which the test liquid can pass is suitably restricted to the side edges and the bottom edge of the strip.

It should be appreciated that for a particular substance the test paper may not need to be impregnated with both a titrant and an indicator. Thus, where the titrant and substance being tested for react to form a reaction product that develops a color or a color change, the equivalence point is determined by the point at which the color change or development is complete.

Turning now to the figures, FIGS. 1 and 2 depict an exemplary embodiment of a test paper 20 made in accordance with the present invention. To serve as the medium for the titrant and indicator as well as having liquid holding capacity for the test solution, there is provided a bibulous member such as, for example, the illustrated flat strip 22 of conventional cellulose acetate paper (i.e., filter paper). A titrant for a particular analysis is impregnated in the strip 22 along a continuous zone. The concentration linearly increases from zero at the bottom 24 to a maximum adjacent the top 26. An indicator suitable for signalling the equivalence point of the titrant reaction product or products involved in the analysis is also impregnated in the strip 22 along the zone at a uniform concentration. Both the titrant and the indicator exist as dried coatings, indicated at 28, on the surface of the fibers comprising the strip and are located throughout the three dimensions of the portion of the strip defined by the titrant zone. The layer of the coatings 28 on the external surfaces (FIG. 2) has been exaggerated for purposes of illustration.

An area, free of titrant and indicator, shown at 30, can be included adjacent one end of the zone to provide the user a place to grip the strip without interfering with the analysis. Also, a scale 32, divided into any convenient units, such as parts per million, can be printed on the strip so that the result of the analysis can be easily read. If the titrant, indicator or any other substance involved in the analysis is soluble in the test liquid or if it is desired to insure that the amount of test liquid retained by the bibulous member along the titrant zone can be precisely determined, one aspect of the present invention provides restricting the surface areas of the bibulous member that the test liquid can contact to a minimum. To this end, and as illustrated in FIGS. 3 and 4, the test paper 20 has as a cover member a coating 34, such as a conventional rubber cement, on the faces of the strip 22. The test liquid can thus enter and saturate the paper strip 22 along the titrant zone only through the edges.

When the test paper is dipped into the test liquid, the solution enters through the edges and dispels the entrapped air, which exits principally through the top edge that is generally not dipped in the liquid. The displacement of the air creates a driving force causing the solution to quickly enter the strip. Once all the air has been displaced, the test strip is saturated with the liquid and there is no longer present any driving force so that there is virtually no tendency for the solution absorbed in the strip to migrate, which migration could affect the accuracy of the analysis if the titrant, indicator or other substance involved is soluble in the test liquid. In some instances it may be desirable to provide an uncoated portion 36 adjacent the bottom of the titrant zone to insure that migration from solution entering the bottom edge is minimized. Alternatively, the bottom edge could be coated as are the faces.

The coating on the faces of the strip along the titrant zone allows the amount of water that is taken up by the strip to be accurately controlled with the concomitant advantage that the accuracy of the test will be increased.

Any coating that is inert with respect to the particular analysis with which the test paper is to be used (i.e., will not be dissolved or be otherwise degraded) can be employed. The coating should have sufficient clarity so the color change or development can be determined.

Rather than including a coating, the cover member can suitably be a film affixed to the strip by an adhesive. As shown in FIGS. 5 through 7, the strip 22 has a film 38 affixed to its faces by an adhesive 40. The film 38 is U-shaped and prevents the bottom edge of the strip indicated at 42, from coming in contact with the test liquid. As was discussed with respect to the embodiment of FIGS. 3 and 4, the bottom edge 42 need not be covered to prevent contact.

The film used should allow the equivalence point to be determined, should be inert with respect to the analysis and desirably should have similar expansion and contraction properties to the test paper, which properties come into play following saturation of the test paper. The adhesive should also be inert as regards the analysis. Conventional Scotch tape can be used for many applications although its expansion properties cause some buckling of the test paper following wetting with a test liquid such as water.

The particular dimensions that are used for the test papers of this invention can be varied as desired because of factors such as the concentration range needed for the particular analysis. Strips having a length of 4 to 8 inches or more, a width of about ¼ and a thickness of about 1/64 inch (0.015 inch) have been found suitable for most applications.

Virtually any titrametric analysis can be carried out by using the prevent invention. Some specific examples include the determination of chloride, hardness in water, caustic alkali in water, acid strength of a solution and active chlorine in water. These could be carried out using the test strips of this invention with the following titrants, indicators and buffers (if any), which examples are considered to be illustrative of the present invention and not in limitation thereof:

Suitable concentrations and the color that is indicated when the test papers described above are used are listed in Table II in Col. 6 above:

TABLE II

| Analysis | Concentration range | Color indicated until equivalence point reached |
|---|---|---|
| Chloride | 0–1,000 parts per million (p.p.m.) chloride (boiler water), 0–10,000 or 25,000 p.p.m. (sea water). | Brick red. |
| Hardness in water | 0–100 or 500 p.p.m. | Blue. |
| Caustic alkali in water. | 0–1% by weight sodium hydroxide (i.e., alkaline degreasing cleaning bath for iron machinery parts). | Pink. |
| Acid strength of a solution. | 0–1% by weight sulfuric acid (i.e., acid cleaning bath solution for descaling steel prior to finishing and painting). | Blue. |
| Active chlorine in water. | 0–100 p.p.m. (bleaching bath in laundry or textile mill). | Do. |

In each of the above illustrative examples, the titrant concentration linearly increases from zero to the maximum amount needed to correspond to the particular concentration range involved in the analysis. The zone of titrant is a true linear graduation and no finite portion of the test strips of this invention has the same concentration. Cutting and testing a small portion, e.g., a ⅛ inch strip, of the titrant zone would illustrate a titrant concentration increasing linearly from one end to the other.

To form the novel test strips and in accordance with one aspect of the present invention, the titrant zone of linearly increasing concentration, and if desired, the uniform concentration of the indicator and any buffer, can be applied to the test strip by utilizing a rotating arcuate surface. A plurality of titrant solutions, each succeeding solution having a concentration greater than the previous one by a predetermined amount, are deposited at a predetermined rate onto the rotating arcuate surface in a side-by-side relationship and the surface is allowed to rotate through a portion of a revolution. At that point, a bibulous member such as filter paper is passed across the surface at a rate which allows the titrant solution to be transferred to the filter paper.

Figure 9:
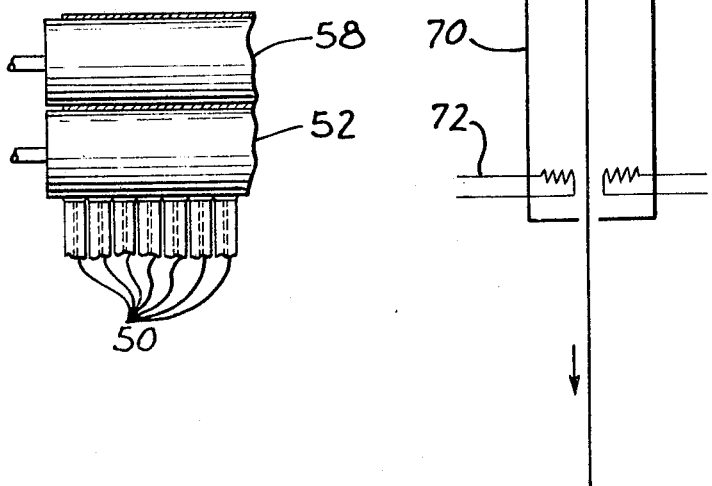
FIG. 9 is a schematic view illustrating, from the side, part of the apparatus depicted in FIG. 8 and showing the relationship of the several capillary tubes forwarding the titrant to the transport roll.

FIGS. 8 and 9 schematically depict apparatus suitable for carrying out the method of this invention. As a representative example, there will be described the method for making a test paper for determining the hardness of water, including a titrant zone of 6 inches in length by ¼ inch in width by 0.015 inch in thickness corresponding to a scale of 0 to 100 parts per million (p.p.m.) hardness with a one inch portion at the top to allow the user to grip the paper.

TABLE I

| Analysis | Titrant | Indicator | Buffer |
|---|---|---|---|
| Chloride | Silver nitrate | Silver Chromate | Sodium carbonate present in amount sufficient to maintain test solution at pH of from 6 to 8. |
| Hardness in water | Trisodium hydrogen ethylenediaminetetraacetate. | Eriochrome Black T | 2 parts sodium carbonate, 1 part sodium bicarbonate concentration suitable to maintain test solution at pH of 9.5–10.5. |
| Caustic alkali in water | Sulfamic acid | Phenolphthalein | None used. |
| Acid strength of a solution. | Lithium hydroxide | Brom Cresol Green | Do. |
| Active chlorine in water | Phenylarsene oxide | Starch and Potassium iodide. | Potassium acid phthalate to give desired pH. |

To provide an indicator and buffer solution, an aqueous stock solution including two grams per liter of Eriochrome Black T plus 7.4 grams lithium carbonate and 6.8 grams lithium bicarbonate per liter is prepared. Twenty-four separate solutions are prepared by adding the following concentrations of disodium dihydrogen ethylenediaminetetraacetate dihydrate to the stock solution identified above.

| Solution number: | Grams titrant added/liter of aqueous stock solution |
|---|---|
| 1 | 0.00 |
| 2 | 0.02 |
| 3 | 0.04 |
| 4 | 0.06 |
| 5 | 0.08 |
| 6 | 0.10 |
| 7 | 0.12 |
| 8 | 0.14 |
| 9 | 0.16 |
| 10 | 0.18 |
| 11 | 0.20 |
| 12 | 0.22 |
| 13 | 0.24 |
| 14 | 0.26 |
| 15 | 0.28 |
| 16 | 0.30 |
| 17 | 0.32 |
| 18 | 0.34 |
| 19 | 0.36 |
| 20 | 0.38 |
| 21 | 0.40 |
| 22 | 0.42 |
| 23 | 0.44 |
| 24 | 0.46 |

Each of the 24 solutions is added to a separate constant head reservoir bottle 44, which maintains a constant head at the discharge end regardless of the depth of solution 46 contained in the bottle. The reservoir bottles are each connected by appropriate tubing 48 to a capillary tube 50. As seen in FIG. 9, the capillary tubes 50 are positioned in a side-by-side relationship across an arcuate rotating surface such as a printing or transfer roll 52. These capillaries 50 may suitably be spaced about 1/32 of an inch from the transfer roll 52 and can be spaced on 1/4 inch centers to initially provide the transfer roll 52 with 24 solutions in the form of a band having about a 1/4 inch width.

The feed rate of the capillary tubes 50 and the speed of the roll 52 should generally be adjusted so that all of the solution 46 feeding from the tubes is easily picked up by the roll. The solutions emerging from the capillary tubes bridge the 1/32 inch gap and deposit themselves on the roll.

The transfer roller 52 is allowed to rotate through a portion of a revolution. This enables the concentrations of the 24 solutions to reorient themselves until there is a titrant concentration zone across the transfer roll linearly increasing from 0 to about 0.46 gram per liter.

At this point, a bibulous member in the form of a paper 54 about 7 inches in width is forwarded from a paper roll 56 by means not shown. It is brought in contact with the solution that has traveled on the transfer roll 52 for a portion of a revolution by passing through a nip formed by a pressure roll 58 and the transfer roll. The speed of the paper 54 should be adjusted so it can absorb substantially all the solution forwarded by the transfer roll.

The impregnated paper 54 is then forwarded to a drying chamber 60 having a heater 62 to evaporate the solvent in the stock solutions. The dried paper 54 can be wound on rolls not shown or can be transversely cut into strips of the desired width to form the test paper of the present invention.

If it is desired to apply a coating or a film to the faces of the paper, the paper 54 after having passed the drying chamber can be forwarded through a reservoir 64 containing the coating solution 66, such as a rubber cement in a hexane solvent. The reservoir should have a width corresponding to the impregnated zone of the paper but should not allow the edges of the paper to be contacted. Doctor blades 68 are positioned adjacent the exit from the reservoir to remove any excess coating. The paper 54 with the coating solution 66 thereon can be further processed by passing through a drier 70 having a heater 72 to evaporate the solvent in the coating solution. The paper can be wound on rolls for storage or cut into strips to form the test papers of this invention.

In accordance with still another aspect of this invention, the test papers can be made by impregnating a moving bibulous member such as filter paper by using a spray nozzle. The moving bibulous member is sprayed with a titrant solution while positioning the spray so that the rate of solution contacting the paper is graduated in a predetermined manner from one side of the paper to the other side. The indicator and buffer, if needed, can be applied to the paper before or after the titrant has been supplied.

FIG. 10 schematically shows apparatus that can carry out the above-described method. To make test paper for determining the hardness of water when the range is 0 to 100 parts per million, for example, a porous paper stock 74 having a width of about 10 inches and a thickness of about 0.015 inch is passed between the nip of pressure roll 76 and transfer roll 78, that can rotate at about 6 revolutions per minute.

To provide the indicator and buffer, a solution containing 100 grams of sodium carbonate, 50 grams of sodium bicarbonate per liter of water is made. Two grams of Eriochrome Black T indicator dye are then dissolved per liter of the solution described above. This solution indicated at 80 can be maintained in a reservoir 82 that feeds a constant level fountain 84. Transfer roller 78 runs in the pan 86 having solution maintained at a constant depth by the fountain 80 and supplies the indicator-buffer solution that is transferred to the paper 74 as it passes through the nip formed by the transfer roll and pressure roll. The rate of application can, for example, be about 12 milliliters per square foot of paper.

The paper is then forwarded by means not shown to a station where a conventional spray nozzle 88 supplied by a titrant source not shown is inclined to spray a titrant solution containing 0.716 gram of trisodium hydrogen ethylenediaminetetraacetate per liter at a graduated, decreasing rate across the width of the paper. The rate is decreased to correspond to a titration range of 0 to 100 parts per million hardness.

The subsequent processing of the paper impregnated with the titrant, indicator and buffer can be accomplished by using apparatus identical to that described with respect to the other method for forming the test papers of this invention.

Determining the linearly increasing titrant concentration that will correspond to a particular concentration range for a particular analysis involves precalculating the amount of titrant needed and then distributing it, in accordance with one of the methods described above, across the titration zone. It should, however, be appreciated that precalculation of the exact concentration required may in some instances require slight modifications or adjustments based upon actual use with the test papers.

Thus, the present invention provides novel test papers that can be used for carrying out virtually any titrametric analysis quickly and accurately regardless of the concentrations involved. If virtual independence from the solubility characteristics of the titrant, indicator or other materials involved in an analysis or increased accuracy is provided, the amount of the surface area of the test papers that the solution can contact is restricted to a minimum by a cover member in the form of a coating or film. The resulting test papers with their unique versatility can also be easily and economically fabricated.

I claim as my invention:

1. A test member for quantitatively carrying out a predetermined analysis on a liquid test source comprising a bibulous member impregnated with a titrant for the analysis in a continuous zone of linearly increasing concentration corresponding to a predetermined concentration range for the analysis, the bibulous member being further impregnated along the zone with an indicator present in an amount sufficient to signal the equivalence point of the titrant reaction product in the analysis.

2. The test member of claim 1 wherein the bibulous member is impregnated along the zone with a buffer capable of maintaining a given pH range.

3. The test member of claim 1 wherein the bibulous member is a planar strip having faces and edges with the zone extending substantially across the length of the face.

4. The test member of claim 1 wherein the bibulous member has a concentration range for the analysis imprinted on its surface.

5. The test member of claim 1 wherein the bibulous member includes an unimpregnated portion adjacent one end of the zone with a size sufficient to allow the user to grasp the test member without contacting the zone.

6. The test member of claim 2 wherein the predetermined analysis is for chloride, the titrant is silver nitrate impregnated in a concentration corresponding to a range of from zero to about 25,000 parts per million of chloride, the indicator is silver chromate and the buffer is capable of maintaining the pH of the liquid test source in a range of from about 6 to 8.

7. The test member of claim 2 wherein the predetermined analysis is for the hardness of water, the titrant is trisodium hydrogen ethylenediaminetetraacetate present in an amount corresponding to a range of from 0 to about 500 parts per million hardness, the indicator is Eriochrome Black T and the buffer is capable of maintaining the liquid test source at a pH in the range of from about 9.5 to 10.5.

8. The test member of claim 1 wherein the predetermined analysis is for caustic alkali, the titrant is sulfamic acid present in an amount corresponding to about 0 to about 1% by weight alkali and the indicator is phenolphthalein.

9. The test member of claim 1 wherein the predetermined analysis is for the acid strength, the titrant is lithium hydroxide and is present in an amount corresponding to 0 to 1% acid and the indicator is Brom Cresol Green.

10. The test member of claim 2 wherein the predetermined analysis is for active chlorine, the titrant is phenylarsene oxide and is present in an amount corresponding to a range from about 0 to 100 parts per million free chlorine, the indicator is starch and including a buffer capable of maintaining the pH of the liquid test source at a predetermined range.

11. The test member of claim 1 including a cover member impermeable to the liquid test source, the cover member covering a major portion of the surface area of the bibulous member and extending across substantially the entire zone in the direction of increasing titrant concentration.

12. The test member of claim 11 wherein the bibulous member is a substantially flat strip having faces and edges and the cover member envelopes substantially the entire portion of the zone defined by the faces.

13. The test member of claim 12 wherein the cover member is a coating deposited on the faces.

14. The test member of claim 12 wherein the cover member is a film attached to the bibulous member by an adhesive.

15. The test member of claim 12 wherein said film envelopes the faces and the edges of the bibulous member adjacent the end at which the concentration zero begins.

16. A method of quantitatively carrying out a predetermined analysis of a liquid test source which comprises contacting the liquid test source with a test strip including a bibulous member impregnated with a titrant in a continuous zone of linearly increasing concentration corresponding to a predetermined concentration range for the analysis and further impregnated aolng the zone with an indicator present in an amount sufficient to signal the equivalence point of the titrant reaction product in the analysis while restricting the portion of the surface area of the bibulous member that the liquid test source can contact to less than about 10% of the total surface area of the bibulous member defined by the zone and thereafter detecting the portion of the zone which has undergone a color change.

17. The method of forming a test member for titrametric analyses, the test member having a continuous zone of titrant in a linearly increasing concentration and an indicator to signal the equivalence point of the titrant reaction product which comprises depositing at a predetermined rate a plurality of titrant solutions in a side-by-side relationship onto a rotating arcuate surface, each succeeding solution having a concentration greater than the previous one by a predetermined amount and including a uniform concentration of an indicator, allowing the arcuate surface to rotate through a portion of a revolution and passing a bibulous member across the rotating surface at that point at a rate which allows the titrant solutions to be transferred to the bibulous member.

18. The method of forming a test member for titrametric analyses, the test member having a continuous zone of titrant in a linearly increasing concentration and an indicator to signal the equivalence point of the titrant reaction product which comprises forwarding a bibulous member, impregnating the bibulous member in a continuous zone with an indicator at a predetermined rate and spraying the bibulous member with a titrant solution having a uniform concentration at a predetermined rate per area of the bibulous member while positioning the spray so that the rate contacting the bibulous member is graduated in a predetermined manner from one side of the bibulous member to the other.

References Cited

UNITED STATES PATENTS 3,127,281  3/1964  Meyer.
3,139,328  6/1964  Jacob.

FOREIGN PATENTS 545,142  5/1942  Great Britain.

MORRIS O. WOLK, Primary Examiner

R. M. REESE, Assistant Examiner

U.S. Cl. X.R.

23—230; 117—37